US006683913B1

(12) United States Patent
Kantschuk

(10) Patent No.: US 6,683,913 B1
(45) Date of Patent: Jan. 27, 2004

(54) NARROWBAND NOISE CANCELLER

(75) Inventor: Amir Kantschuk, Ramat Gan (IL)

(73) Assignee: Tioga Technologies Inc., San Jose, CA (US)

( * ) Notice: Subject to any disclaimer, the term of this patent is extended or adjusted under 35 U.S.C. 154(b) by 0 days.

(21) Appl. No.: 09/476,748

(22) Filed: Dec. 30, 1999

(51) Int. Cl.[7] .............................................. H04B 15/00
(52) U.S. Cl. ...................... 375/258; 375/349; 455/303; 455/311; 333/12
(58) Field of Search ................................ 455/296, 303, 455/307, 311, 312; 333/12; 379/416; 370/286–292; 375/346, 349, 350, 258, 259; 329/318–320, 349, 353

(56) References Cited

U.S. PATENT DOCUMENTS

| 3,665,171 | A |   | 5/1972  | Morrow ...................... 375/233 |
| 5,249,200 | A |   | 9/1993  | Chen et al. |
| 5,293,402 | A |   | 3/1994  | Crespo et al. |
| 5,420,884 | A |   | 5/1995  | Inoue |
| 5,550,596 | A |   | 8/1996  | Strolle et al. |
| 5,604,769 | A |   | 2/1997  | Wang |
| 5,930,310 | A | * | 7/1999  | Freeman ...................... 375/346 |
| 5,995,566 | A | * | 11/1999 | Rickard et al. ............. 375/346 |
| 6,014,412 | A | * | 1/2000  | Wiese et al. ................. 375/346 |
| 6,052,420 | A | * | 4/2000  | Yeap et al. .................. 375/346 |
| 6,404,810 | B1|   | 6/2002  | Girardeau, Jr. et al. |
| 6,430,287 | B1|   | 8/2002  | Rao |

FOREIGN PATENT DOCUMENTS

WO     WO 97/40587     10/1997

OTHER PUBLICATIONS

Haykin, Simon, "Adaptive Filter Theory", Third Addition, New Jersey (U.S.A.), pp. 432–438, and pp. 455–482, 1996.
T1E1.4–96/025, "Radio Frequency Interference Aspects of VDSL", New Jersey (U.S.A.), Jan. 23, 1996, pp. 1–5.
T1E1.4–96/084, "Analog RF Cancellation with SDMT (96–084)", Calif. (U.S.A.), Apr. 22, 1996, pp. 1–9.
T1E1.4–95/142, Balance Measurements on BT Drop Wire 10 (ETSI TD52 Helsinki), North Carolina (U.S.A.), Nov. 9, 1995, pp. 1–9.

* cited by examiner

Primary Examiner—Amanda T. Le
(74) Attorney, Agent, or Firm—Abelman Frayne & Schwab

(57) ABSTRACT

A high-speed receiver, adapted to receive signals over an input line in the presence of narrowband radio frequency interference (RFI). The receiver includes a RFI canceller module, which is coupled to receive samples of the interference from the input line. The module includes an adaptive bandpass filter, which is adapted to track a dominant frequency of the interference, and to generate a filtered output in a narrow frequency range centered on the dominant frequency. A corrector is coupled to receive the filtered output from the adaptive bandpass filter and to generate, responsive thereto, an estimate of the interference in the signals received by the receiver. A subtractor is adapted to subtract the estimate of the interference from the signals received by the receiver so as to generate a corrected output signal.

12 Claims, 7 Drawing Sheets

NARROWBAND NOISE CANCELLER

FIELD OF THE INVENTION

The present invention relates generally to high-speed data communications, and specifically to methods and systems for rejection of radio frequency (RF) noise in Digital Subscriber Line (DSL) modems.

BACKGROUND OF THE INVENTION

Digital Subscriber Line (DSL) is a modem technology that enables broadband digital data to be transmitted over twisted-pair wire. This is the type of infrastructure that links most home and small business subscribers to their telephone service providers. DSL modems enable users to access digital networks at speeds tens to hundreds of times faster than current analog modems and basic ISDN service. DSL thus opens the most critical bottleneck in local-loop access to high-speed networks, such as Asynchronous Transfer Mode (ATM) and Internet Protocol (IP) networks, without requiring major investments in new infrastructure.

A range of DSL standards have been defined, known generically as "xDSL," wherein the various standards have different data rates and other associated features but share common principles of operation. These standards include High-Speed DSL (HDSL), at relative low frequencies (<500 kHz); Asymmetric DSL (ADSL), with an intermediate frequency range (30–1100 kHz); and Very High Speed DSL (VDSL), in a high frequency range (0.3–20 MHz). VDSL modems support the highest possible data rates on existing twisted-pair wire, with downstream bit rates of up to 50 Mb/sec. It is expected that in the near future, VDSL systems will come to dominate subscriber equipment on the telephone network.

One problem of VDSL implementation is that the frequency band of VDSL (up to 20 MHz) overlaps with several RF bands used for amateur and commercial radio transmissions. Twisted-pair wire is particularly prone to picking up radio frequency interference (RFI) from external sources. To avoid interference from existing RF systems, VDSL modems must be designed with reduced sensitivity to RFI. This problem becomes more severe the higher the transmission frequency and can cause significant degradation of VDSL signals.

Bodies concerned with defining VDSL standards have published documents that relate to issues of RFI and suggest possible solutions. For example, document T1.E1.4/95-142, promulgated by the T1E1.4 Technical Subcommittee Working Group of the American National Standards Institute (ANSI) and incorporated herein by reference, presents balance measurements of typical VDSL drop wires. The document describes typical power levels of RFI that are encountered. It concludes that longitudinal conversion loss (LCL—representing RFI crosstalk from the common to the differential mode) of 30–35 dB should be taken into account in designing receivers to deal with interference from radio transmissions. The RFI amplitude in the differential signal may thus be as high as 0 dBm (300 mV). Interference between VDSL signals and radio transmissions is also described in other technical papers, such as T1E1.4 Technical Subcommittee Working Group document T1.E1.4/96-025, which is likewise incorporated herein by reference.

The most problematic kind of interference stems from single side band (SSB) modulated transmissions, as are used in amateur radio. Amateur band SSB transmissions are modulated by human speech, which can be modeled as a series of syllables interrupted by short quiet periods. Therefore, the interfering signals are generally stationary only over very short terms. Any noise cancellation that is used must typically adapt to changes in the RFI level within about a millisecond.

T1E1.4 Technical Subcommittee Working Group document T1.E1.4/96-084, which is incorporated herein by reference, describes stationarity properties of RFI sources. The document suggests a method of mitigating short-term stationary RFI in VDSL signals by implementing an adaptive noise canceling module. The suggested method uses a least mean square (LMS) algorithm to rapidly update the noise canceler during periods of silence of the VDSL signals. The document notes that adaptive updating of the module will typically suffer from a problem known as high eigenvalue spread, which slows convergence and exacerbates dynamic range needs of the signal processing. A number of possible solutions are suggested, which may alleviate but do not eliminate the problem.

Methods of noise cancellation for use in DSL systems are also described in PCT Patent Application PCT/US97/06381, published as WO 97/40587, whose disclosure is incorporated herein by reference. This application shows a receiver system for high-speed data communications, such as ADSL or VDSL, having a RF noise canceller. The noise canceller adaptively estimates the radio frequency noise coming into the receiver through twisted pair input lines. The estimate is used to generate a noise cancellation signal, which is subtracted from the signals coming into the receiver. The noise estimate is based on a common-mode reference noise signal, which is sampled at a transformer that couples the input lines to the receiver.

SUMMARY OF THE INVENTION

It is an object of some aspects of the present invention to provide improved methods and apparatus for mitigating RFI in high-speed data receivers, and particular in VDSL modems and systems.

It is a further object of some aspects of the present invention to provide a RFI canceller that rapidly tracks and adapts to changes in the characteristics of RFI signals, particularly signals that are short-term stationary, such as SSB signals.

It is yet a further object of some aspects of the present invention to provide a RFI canceller module for use in a data receiver, wherein the module operates substantially autonomously of other data receiver functions, and shuts off when RFI is absent.

In preferred embodiments of the present invention, a high-speed data receiver receives signals over an input line. The receiver comprises an adaptive, narrow-band RFI canceller module, which samples noise on the input line, typically common mode noise arising due to ambient RFI. The module comprises an adaptive bandpass filter (BPF), which rapidly locks onto a narrow frequency range of the strongest RF component in the sampled noise and filters out data and wideband noise that are outside this range. The module processes the resultant narrowband interference signal in order to derive a noise cancellation output, which is subtracted from the signals received over the input line.

Preferably, the module uses a normalized least-mean-square (LMS) method to determine filter coefficients by which the narrowband interference signal is multiplied in order to generate the noise cancellation output. This method converges rapidly to an optimal coefficient value and is therefore particularly useful when the RFI is only short-term stationary. The RFI canceller module is thus optimized to reject the type of common mode interference that arises due to radio transmissions picked up by the line, substantially without introducing any signal degradation outside the interference band.

In some preferred embodiments of the present invention, the adaptive BPF comprises a notch filter element and a bandpass filter element, coupled in parallel to receive the sampled input noise. The notch filter element is used to determine the frequency of the strongest RF component in the sampled noise, by adjusting the notch filter parameters to minimize the notch filter output power. The bandpass filter element uses this determined frequency, and optionally other filter parameters, as well, to lock onto the frequency range of the strongest RF component.

In some preferred embodiments of the present invention, the module comprises a shutoff mechanism, which monitors the amplitude of the RFI and shuts off the noise cancellation output when the amplitude drops below a given minimum level. Preferably, the mechanism monitors aspects of the narrowband signal passed by the BPF, most preferably by checking the values of the above-mentioned filter coefficients. When the absolute values of the coefficients rise above a certain threshold, it is an indication that the RFI has dropped below the minimum level, and the output is shut off. In this manner, it is ensured that the module will not inadvertently cancel the signal or amplify wideband common mode noise occurring on the line.

In some preferred embodiments of the present invention, the data receiver comprises a DSL modem, typically a VDSL modem, which receives signals over a twisted pair line. The RFI canceller module samples a common mode input from the line to the modem. Most preferably, the module samples signals in a common mode choke at the input to the modem, as described in a U.S. patent application entitled "Method and Apparatus for RF Common-Mode Noise Rejection in a DSL Receiver," filed on even date, which is assigned to the assignee of the present patent application, and whose disclosure is incorporated herein by reference. Alternatively (although generally less desirably), the module may sample the common mode at substantially any other suitable point in the modem, such as from a transformer that couples the line to the modem, as described in the above-mentioned PCT Patent Application PCT/US97/06381. Typically, the RFI detected and canceled by the module arises due to amateur or commercial radio transmissions, although narrow-band noise due to other sources will also be tracked and canceled.

In preferred embodiments of the present invention, the RFI canceller module digitizes the sampled noise, and applies digital filtering and signal processing techniques thereto. In some of these preferred embodiments, the module applies the filtering and processing to the digitized RF noise samples without downconversion, and the noise cancellation output is subtracted from the digitized RF signals received by the receiver. In these embodiments, an accelerated, normalized LMS method is preferably used to determine the filter coefficients, in order to overcome possible problems of eigenvalue spread. In other preferred embodiments, however, the noise and signals are down-converted, preferably to baseband, and the filtering, processing and subtraction take place at the baseband or other reduced frequency. Although these preferred embodiments are based on digital processing, it will be understood that the principles of the present invention may similarly be implemented using analog processing techniques, or a combination of analog and digital processing elements, as are known in the art.

There is therefore provided, in accordance with a preferred embodiment of the present invention, a high-speed receiver, adapted to receive signals over an input line in the presence of narrowband radio frequency interference (RFI), including:

a RFI canceller module, which is coupled to receive samples of the interference from the input line, and which includes:
an adaptive bandpass filter, which is adapted to track a dominant frequency of the interference, and to generate a filtered output in a narrow frequency range centered on the dominant frequency; and
a corrector, which is coupled to receive the filtered output from the adaptive bandpass filter and to generate, responsive thereto, an estimate of the interference in the signals received by the receiver; and
a subtractor, which is adapted to subtract the estimate of the interference from the signals received by the receiver so as to generate a corrected output signal.

Preferably, the signals include differential signals received on the line, and the RFI canceler module is coupled to sample common-mode noise on the input line, and to generate the estimate of the interference responsive thereto. Further preferably, the line includes a twisted-pair cable, and the receiver is included in a Digital Subscriber Line (DSL) modem, wherein most preferably, the signals include Very High Speed DSL (VDSL) signals.

Typically, the interference arises from radio transmissions in a vicinity of the line, including single side band transmissions, wherein the interference arising from the radio transmissions is no more than short-term stationary.

In a preferred embodiment, the receiver includes a downconverter, which is configured to downconvert the samples of the interference before processing thereof by the module. Preferably, the corrector is adapted to generate estimated phase and quadrature components of the interference, and wherein the subtractor includes a pair of subtractors, which are configured to subtracted the phase and quadrature components of the interference, respectively, from phase and quadrature components of the signal.

In another preferred embodiment, the module is adapted to process the samples of the interference substantially without downconversion thereof, and the receiver includes a downconverter, which is configured to downconvert the corrected output signal generated by the subtractor.

Preferably, the receiver includes:
a main analog/digital converter, coupled to generate digitized samples of the signal; and
an auxiliary analog/digital converter, coupled to generate digitized samples of the interference, which are received by the RFI canceller module, wherein the filter, corrector and subtractor operate on the digitized samples.

Preferably, the corrector is adapted to determine a variable filter coefficient using a normalized least-mean-square method and to apply the coefficient to the filtered output from the adaptive bandpass filter so as to generate the estimate of the interference. Further preferably, the RFI canceller module includes a shutoff mechanism, which is adapted, responsive to a value of the filter coefficient, to inhibit subtraction of the estimate of the interference from the signals. Most preferably, the shutoff mechanism is configured to inhibit the subtraction when the value of the filter coefficient rises above a predetermined threshold.

Alternatively or additionally, the RFI canceller module includes a shutoff mechanism, which is adapted to inhibit subtraction of the estimate of the interference from the signals when an amplitude of the narrowband interference on the line drops below a given minimum level.

There is also provided, in accordance with a preferred embodiment of the present invention, a high-speed receiver, adapted to receive signals over an input line in the presence of radio frequency interference (RFI), including:

a corrector, which is coupled to receive samples of the interference from the input line and to generate, responsive to the interference, an estimate of the interference in the signals received by the receiver;

a subtractor, which is adapted to subtract the estimate of the interference from the signals received by the receiver so as to generate a corrected output signal; and a shutoff mechanism, which is adapted to inhibit subtraction of the estimate of the interference from the signals when an amplitude of the interference on the line drops below a given minimum level.

Preferably, the shutoff mechanism is adapted to inhibit and to re-initiate the subtraction substantially autonomously.

Typically, the interference at least intermittently includes a narrowband interference component, and the shutoff mechanism is adapted to inhibit the subtraction when the narrowband interference component drops below the given minimum level.

There is further provided, in accordance with a preferred embodiment of the present invention, a method for processing signals received over an input line in the presence of narrowband radio frequency interference (RFI), including:

tracking a dominant frequency of the interference;

filtering the interference so as to generate a filtered output in a narrow frequency range centered on the dominant frequency;

generating, responsive to the filtered output, an estimate of the interference in the signals received over the line; and subtracting the estimate of the interference from the received signals so as to generate a corrected output signal.

There is moreover provided, in accordance with a preferred embodiment of the present invention, a method for processing signals received over an input line in the presence of radio frequency interference (RFI), including:

generating, responsive to samples of the interference received from the input line, an estimate of the interference in the signals received over the line;

subtracting the estimate of the interference from the received signals so as to generate a corrected output signal; and automatically inhibiting subtraction of the estimate of the interference from the signals when an amplitude of the interference on the line drops below a given minimum level.

There is additionally provided, in accordance with a preferred embodiment of the present invention, an adaptive bandpass filter, including:

a notch filter element, coupled to receive an input signal having a strong narrowband component, the notch filter element having one or more variable filter parameters that are adjusted so as to minimize an output of the notch filter element responsive to the input signal; and a bandpass filter element, coupled to filter the input signal responsive to the adjusted parameters of the notch filter element so as to preferentially pass the narrowband component of the signal.

Preferably, the one or more variable filter parameters include a variable center frequency of the notch filter element, which is adjusted so as to minimize the output of the notch filter, thereby determining a dominant frequency of the narrowband component. Further preferably, the bandpass filter element is adapted to pass the input signal within a narrow frequency range centered on the dominant frequency determined by the notch filter.

There is moreover provided, in accordance with a preferred embodiment of the present invention, a method of adaptive bandpass filtering, including:

receiving an input signal having a strong narrowband component;

filtering the input signal using a notch filter having one or more variable notch filter parameters, so as to generate a notch filter output;

adjusting the one or more variable notch filter parameters responsive to the input signal so as to minimize the notch filter output; and filtering the input signal using a bandpass filter having at least one variable bandpass filter parameter, which is adjusted responsive to the one or more adjusted variable notch filter parameters.

The present invention will be more fully understood from the following detailed description of the preferred embodiments thereof, taken together with the drawings in which:

DETAILED DESCRIPTION OF PREFERRED EMBODIMENTS

Figure 1:
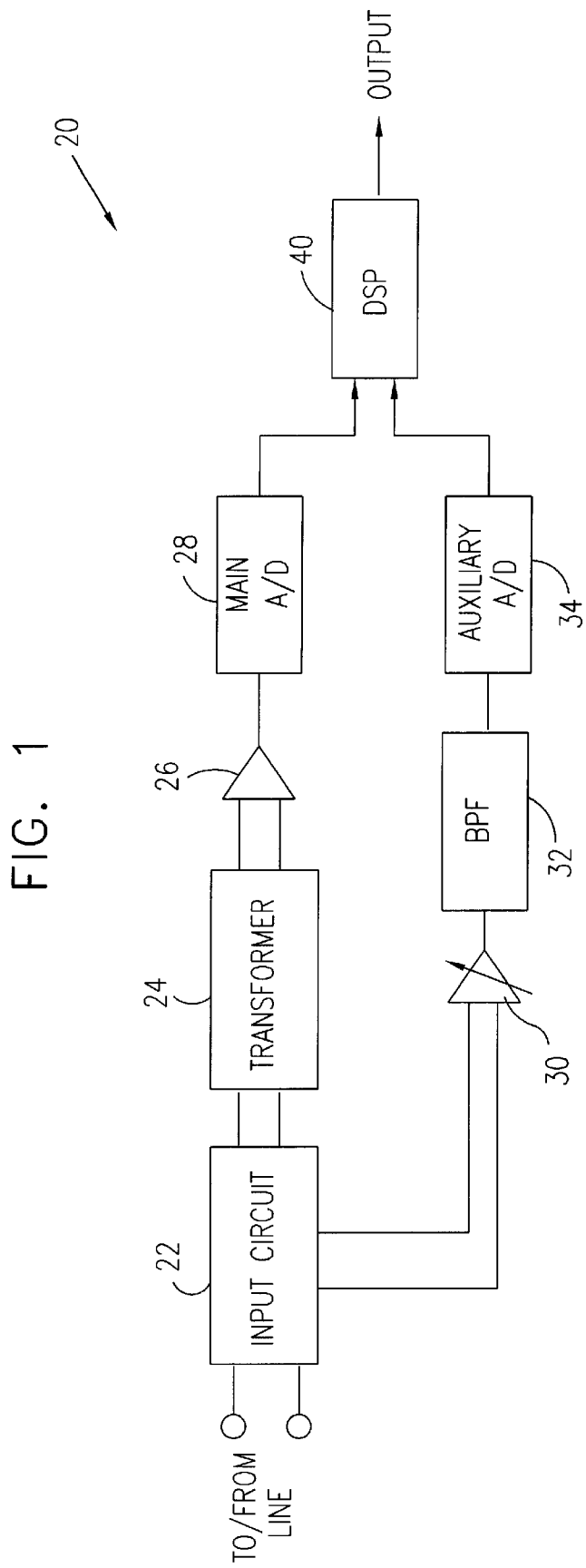
FIG. 1 is a block diagram that schematically illustrates a high-speed data receiver, in accordance with a preferred embodiment of the present invention.

FIG. 1 is a block diagram that schematically illustrates a high-speed data receiver 20, in accordance with a preferred embodiment of the present invention. Typically, receiver 20 is part of a VDSL modem, which receives signals over a twisted pair input line. As noted hereinabove, these signals are often accompanied by common-mode RFI, due particularly to amateur and commercial radio transmissions. Alternatively, receiver 20 may be coupled to input lines of other types and may be adapted to receive and process signals transmitted in accordance with other standards, as are known in the art.

Signals are received over the input line by an input circuit 22. The input circuit preferably comprises a common-mode choke, with two signal windings for filtering common-mode interference out of the input signal, and a third winding for sampling the common-mode component on the signal windings. Such a common-mode choke is described in detail in the above-mentioned U.S. patent application. Alternatively, the common-mode component may be sampled at another location on the input line or by other means in the input circuits of receiver 20. Further alternatively, the common-mode component may be sampled at a transformer 24, which receives the input signals from input circuit 22. Signals received from transformer 24 are amplified by a differential amplifier 26 and digitized by a main analog/digital (A/D) converter 28, preferably a high-speed 12-bit converter. A digital signal processor (DSP) 40 decodes the digitized signals, as is known in the art, so as to provide a data output to a computer or other terminal equipment. Prior to decoding, the DSP also performs a noise cancellation function, as described hereinbelow.

The common-mode component sampled at input circuit 22 is coupled to a differential amplifier 30 having a variable gain, which is preferably adjusted based on the level of interference. The amplified interference signal is preferably filtered by a bandpass filter 32 to eliminate interference outside a frequency range of interest to receiver 20. The range of interference signals passed by filter 32 generally corresponds to the entire possible range of interfering RF signals, rather than to any particular narrow band in the range. An auxiliary A/D converter 34, preferably a 9-bit converter, digitizes the interference signals and passes the resultant digital data to DSP 40.

Figure 2:
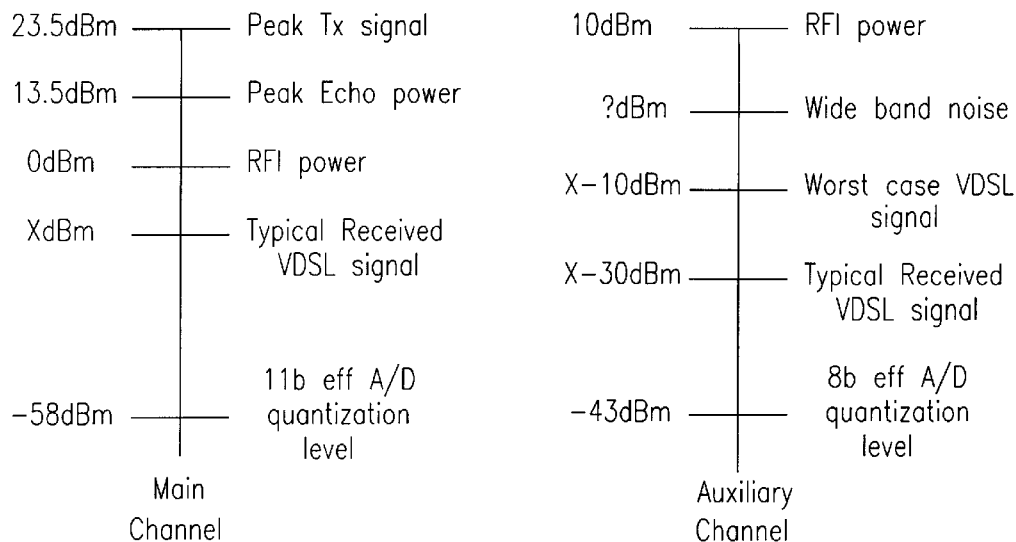
FIG. 2 is a chart that illustrates signal and interference levels typically encountered in a DSL modem, useful in understanding preferred embodiments of the present invention.

FIG. 2 is a chart that schematically illustrates signal and interference levels typically encountered by receiver 20, assuming the receiver to be a part of a VDSL modem or similar system. The "main channel" in this chart refers to the differential signals received and digitized by main A/D 28, while the "auxiliary channel" refers to the common-mode signals received and digitized by auxiliary A/D 34.

In the main channel, the strongest component is echo of signals transmitted by the modem, at 13.5 dBm. These signals are effectively cancelled by suitable echo cancellation in DSP 40, as in known in the art. (Such echo cancellation is beyond the scope of the present patent application, and is therefore not illustrated in the figures.) The presence of the echo at A/D 28, however, limits the dynamic range of the main channel to a minimum level of −58 dBm, unless a very costly, higher-resolution A/D converter is used. Typically, due to longitudinal conversion loss (LCL, or crosstalk) between the common-mode and differential signals entering the receiver, the RFI power in the main channel is still about 0 dBm, as noted in the Background of the Invention. The VDSL signal level, on the other hand, marked "X dBm" in the chart, is generally about −10 to −20 dBm, giving 6–8 bits of usable dynamic range.

In the auxiliary channel, the RFI power is typically 10 dBm or more when a radio transmission is taking place in the vicinity of the receiver. The RFI signal in the auxiliary channel is processed by DSP 40 and subtracted from the main channel signal, in order to remove the interference from the received VDSL signal. Typically, for the levels of RFI power shown in FIG. 2, a gain of about −10 dB would have to be applied to the RFI signal before subtraction. On the other hand, when there is no interfering transmission going on (as is frequently the case when the RFI is due to amateur radio use, for example), the RFI power can drop to a negligible level.

The auxiliary channel also carries wideband noise, whose level is difficult to predict, along with VDSL signals, attenuated by 10 to 30 dB, due to LCL from the main channel. Typically, the wideband noise is in the range of −20 dBm. When RFI is absent or very weak, the wideband noise and/or VDSL signals can come to dominate the auxiliary channel. It is desirable that DSP 40 recognize this situation, and cease the subtraction of the processed auxiliary channel signal from the main channel signal when it occurs, in order to avoid injecting additional noise and/or degrading the VDSL signal coming from the main channel.

Figure 3:
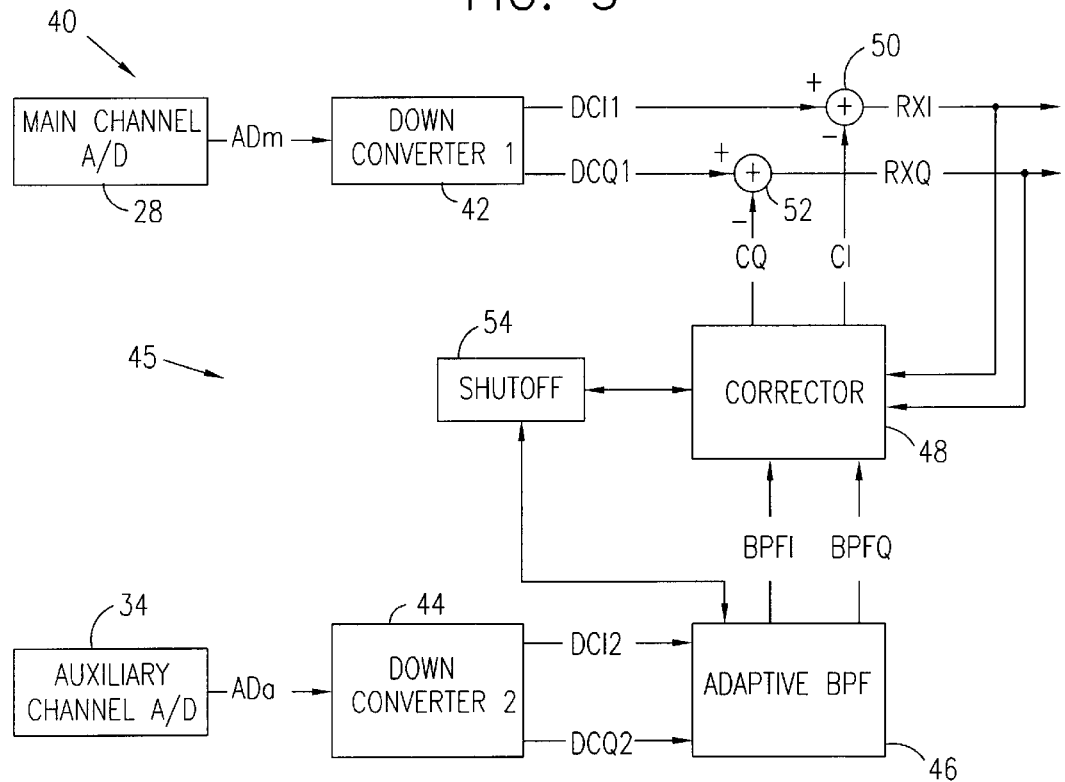
FIG. 3 is a block diagram that schematically illustrates details of a digital signal processor, including a RFI canceller module, used in the receiver of FIG. 1, in accordance with a preferred embodiment of the present invention.

FIG. 3 is a block diagram that schematically illustrates selected elements of DSP 40 that are involved in RFI cancellation, in accordance with a preferred embodiment of the present invention. In this embodiment, digital data output by main channel A/D 28, labeled ADm, are downconverted by a main downconverter 42, to generate phase and quadrature baseband data DCI1 and DCQ1. Data output by auxiliary channel A/D 34, labeled ADa, are likewise downconverted by an auxiliary downconverter 44 to generate data DCI2 and DCQ2. The auxiliary channel data are processed by a RFI canceller module 45, as described in detail hereinbelow, to generate phase and quadrature correction data CI and CQ. These correction data are subtracted from baseband data DCI1 and DCQ1 at adders 50 and 52, respectively, to generate corrected phase and quadrature outputs, RXI and RXQ. The outputs are then processed by the DSP to recover the original transmitted data, as is known in the art.

Figure 8:
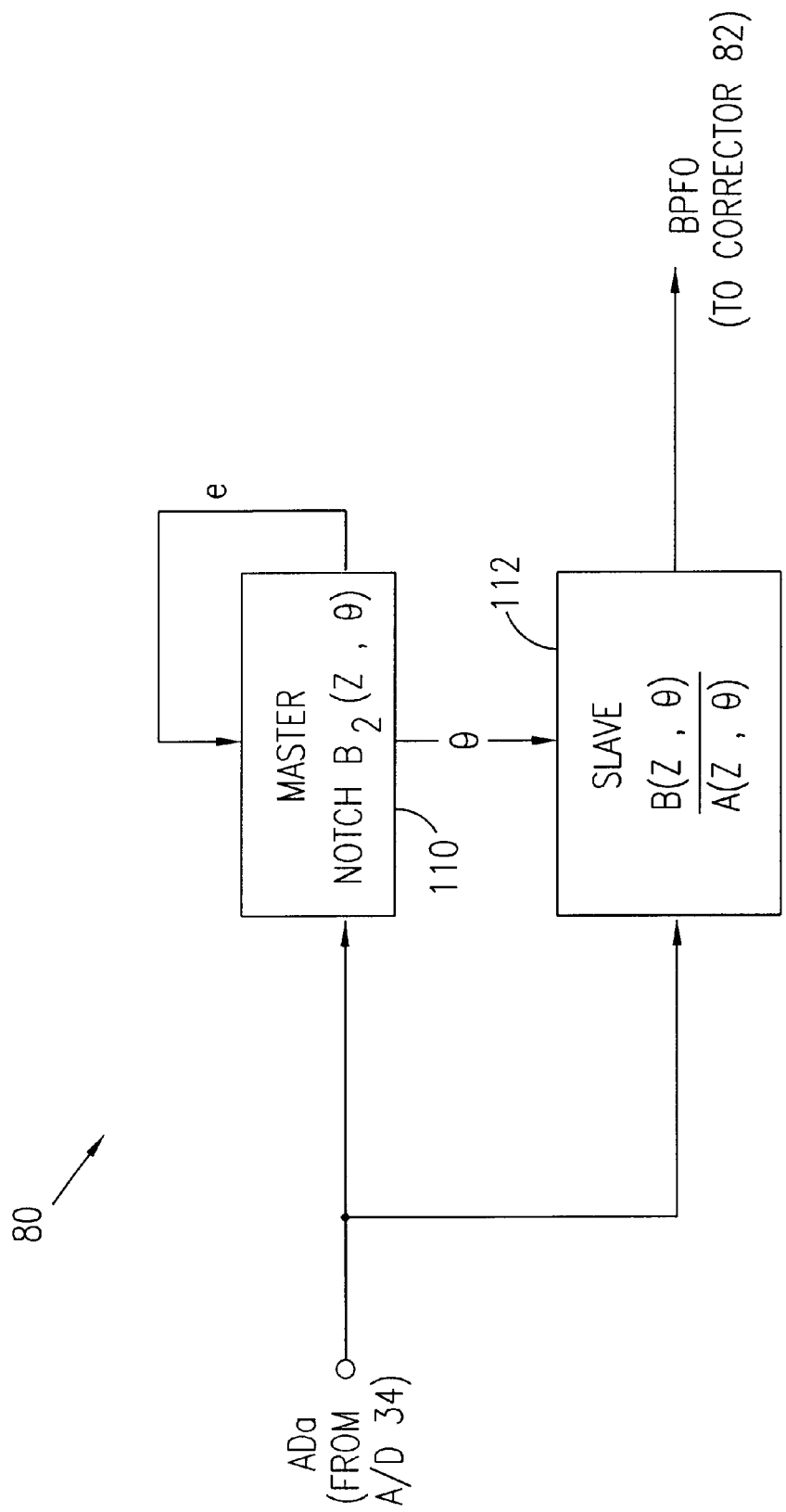
FIG. 8 is a block diagram that schematically illustrates an adaptive bandpass filter, in accordance with a preferred embodiment of the present invention.

Module 45 comprises an adaptive bandpass filter (BPF) 46 and an error corrector block 48, which is switched by a shutoff mechanism 54. BPF 46 locks onto the strongest frequency of the RFI within the range of frequencies of interest and generates band-limited output data BPFI and BPFQ. The bandwidth of the BPF preferably corresponds to the typical bandwidth of interfering radio transmissions, such as SSB transmissions, which is on the order of 4 kHz. In this manner, wideband noise and VDSL signals in the auxiliary channel are substantially filtered out by module 45. A preferred implementation of such a BPF is shown in FIG. 8 and described with reference thereto.

Corrector 48 generates correction data CI and CQ by estimating the RFI component in the main channel data DCI1 and DCQ1. The RFI is preferably estimated as a linear function of the interference data BPFI and BPFQ. As long as there is only a single source of RFI, which is limited to within the passband of BPF 46, such linear estimation of the RFI can be nearly perfect. Thus, the degree of RFI rejection attainable using module 45 is limited substantially only by the resolution of A/D converters 28 and 34. Optionally, BPF 46 and corrector 48 may be configured to deal with two or more bands of RFI, in case there are multiple radio transmissions interfering with signal reception.

The purpose of shutoff mechanism 54 is to shut off module 45 when RFI in the auxiliary channel is lower than the wideband noise or VDSL signal levels in that channel. In such a case, BPF 46 may not be able to lock onto any frequency and will simply pass the auxiliary channel data DCI2 and DCQ2 unattenuated. Alternatively, the BPF may lock onto the VDSL signal, as the strongest narrowband component in the auxiliary channel, so that corrector 48 will attempt to cancel the signal itself. Therefore, shutoff mechanism 54 monitors the behavior of BPF 46 and/or corrector 48 in order to detect when the RFI drops below a minimum level. In one preferred embodiment, the shutoff mechanism monitors a gain applied by corrector 48 to data BPFI and BPFQ in order to generate outputs CI and CQ, and shuts off the interference correction if the gain rises above about 0 dB. Two possible implementations of shutoff mechanism 54 are described hereinbelow with reference to FIGS. 9 and 10. Other possible implementations will be apparent to those skilled in the art.

In an alternative embodiment of the preferred embodiment, not shown in the figures, the order of operation of downconverter 44 and adaptive BPF 46 is reversed. In this embodiment, the BPF operates on the auxiliary channel signals at their full passband frequency, before downconversion, like an adaptive BPF 80 shown in FIGS. 6 and 8 and described hereinbelow. The downconverter then operates only on the filtered samples output by the BPF.

Figure 4:
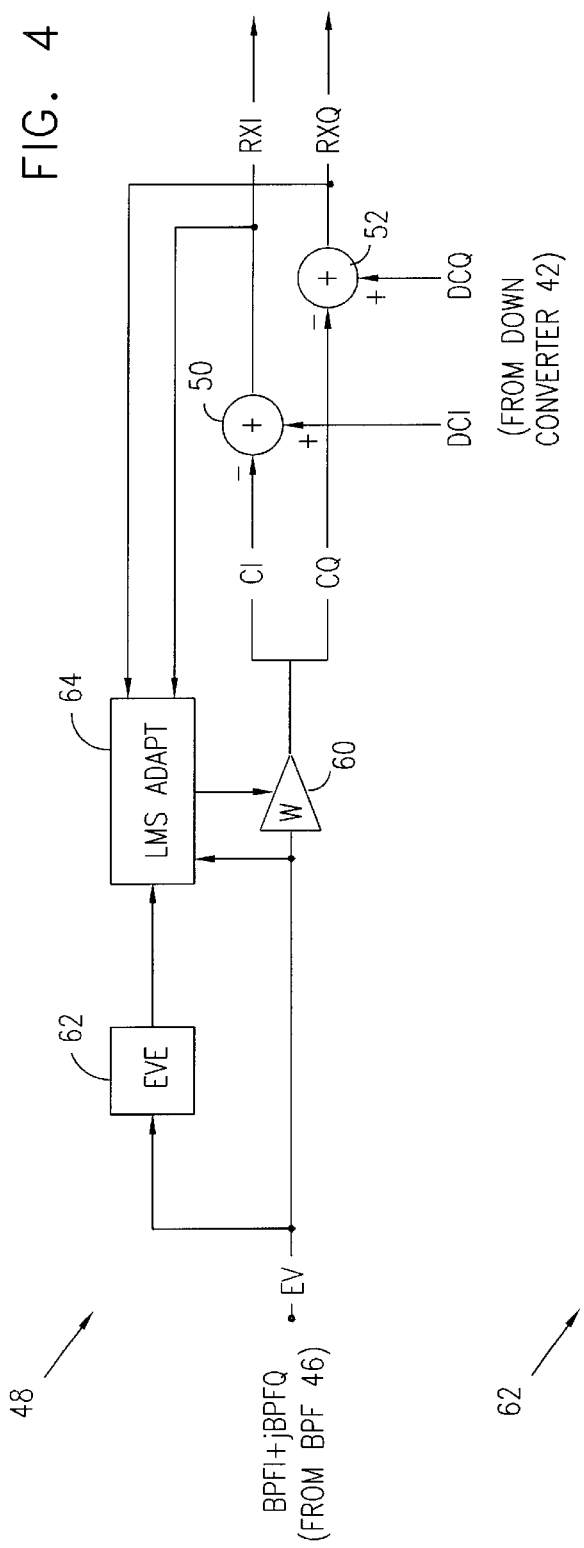
FIG. 4 is a block diagram that schematically illustrates further details of the RFI canceller module of FIG. 3, including a normalized least-mean-square (LMS) adaptation block, in accordance with a preferred embodiment of the present invention.

FIG. 4 is a block diagram that schematically illustrates details of corrector 48, in accordance with a preferred embodiment of the present invention. The corrector is implemented as a finite impulse response (FIR) filter with a single complex tap 60, which applies a variable gain coefficient W to the complex data samples output by BPF 46. For convenience, these samples are labeled EV(n)=BPFI+jBPFQ, wherein n is a running index of the samples. An eigenvalue estimator 62 calculates estimated eigenvalues EVE(n) of the sample sequence, as described hereinbelow with reference to FIG. 5. A normalized least-mean-square (LMS) adaptation module 64 determines the coefficients W(n) based on the eigenvalues and the interference samples EV(n), and on feedback of the corrected outputs RXI and RXQ, in accordance with the following formula:

$$W(n+1) = W(n) + \mu \cdot EV*(n) \cdot [RXI(n) + jRXQ(n)] \frac{1}{EVE(n) + \delta} \quad (1)$$

In this formula, $\mu$ is a variable step size parameter used to normalize the tracking of coefficients W(n), in order to maintain a constant rate of convergence, even when the input signal power EV is low. Typically $\mu$ is on the order of 0.1. Most preferably, the step size shifts according to the most significant bit of the power of the input signal EV(n). Further preferably, to avoid anomalies when the input signal is near zero, $\mu$ is limited to some minimum value, for example, by representing it as a fixed-point number. The parameter $\delta$ is preferably adjusted to an optimal value for the operating conditions of receiver 20, which is typically about three orders of magnitude below the level of the estimated eigenvalues. Alternatively, for convenience of computation, the division operation in equation (1) may be implemented using the approximation:

$$\frac{1}{EVE(n) + \delta} \approx 2^{-fix[\log(EVE(n))]} \quad (2)$$

Here "fix" takes the largest integer in its argument.

Further details of the normalized LMS method are described by S. Haykin in *Adaptive Filter Theory* (3rd edition, Prentice Hall, 1996), which is incorporated herein by reference, pages 432–438.

Under common VDSL operating conditions, the coefficients W(n) of corrector 48 converge within less than 1000 samples EV(n) following a change in input signal power. Given a typical symbol rate for VDSL systems of at least 1 Mbaud/sec, this means that RFI canceller module 45 will track changes that are in the order of 1 ms. This means that the embodiment should converge and track in less than 1000 steps.

Preferably, the value of W is fed to shutoff mechanism 54. If W goes above a predetermined threshold, typically on the order of 0 dB, it is assumed that there is no significant RFI in the signals received by receiver 20, and the output of module 45 is consequently shut off.

Figure 5:
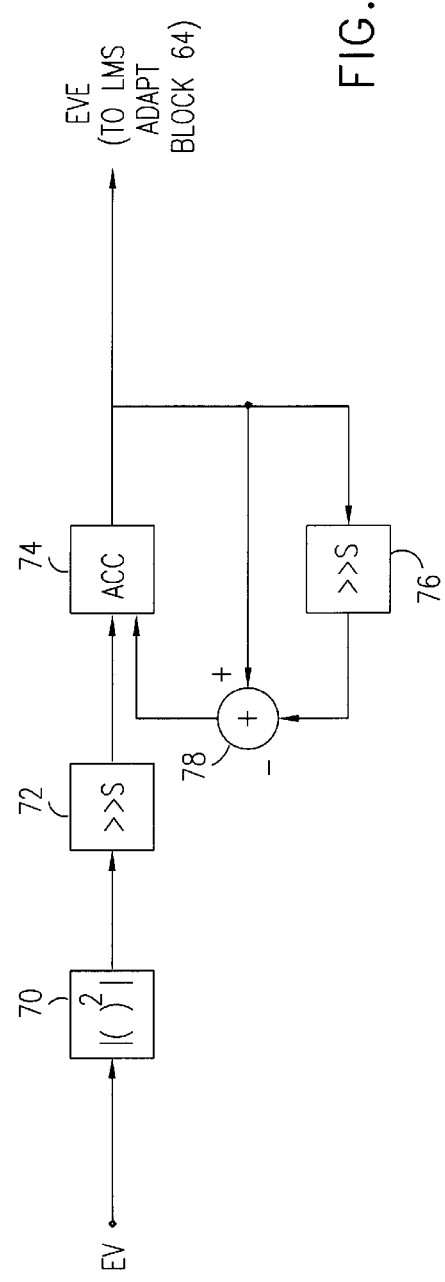
FIG. 5 is a block diagram that schematically illustrates details of the LMS adaptation block of FIG. 4, in accordance with a preferred embodiment of the present invention.

FIG. 5 is a block diagram that schematically illustrates details of eigenvalue estimator 62, in accordance with a preferred embodiment of the present invention. Estimator 62 implements the formula:

$$EVE(n)=2^{-S} \cdot EV^2(n)+(1-2^{-S}) \cdot EVE(n-1) \quad (3)$$

In this equation, S is a smoothing parameter, typically set to about 4–6. A multiplier 70 generates the square of EV(n), which is then shifted right by S places by a shifter 72. An accumulator 74 stores the current value of EVE (n). This value is fed back to the accumulator through a feedback loop comprising a shifter 76 and an adder 78, to be summed with the next, multiplied value of EV.

Figure 6:
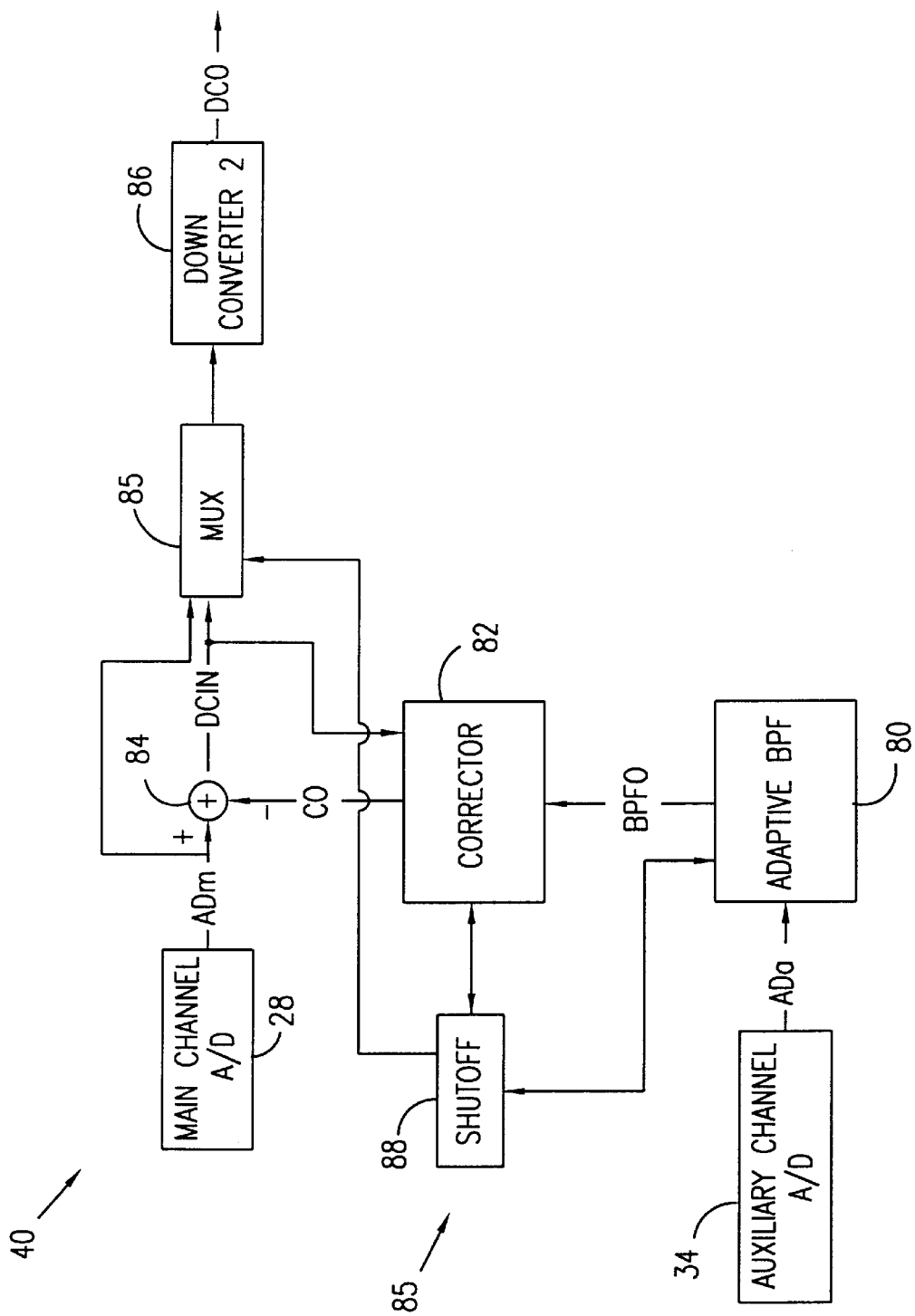
FIG. 6 is a block diagram that schematically illustrates details of a digital signal processor, including a RFI canceller module, used in the receiver of FIG. 1, in accordance with another preferred embodiment of the present invention.

FIG. 6 is a block diagram that schematically illustrates elements of DSP 40 used in RFI cancellation, in accordance with another preferred embodiment of the present invention. In this embodiment, a RFI canceller module 85 operates on the passband data from auxiliary channel A/D 34, labeled ADa, without prior downconversion. The correction data generated by module 85, labeled CO, are likewise subtracted from the main channel data, labeled ADm, by an adder 84 to generate corrected data, DCIN. A multiplexer 85 selects either the corrected data or the uncorrected main channel data to be downconverted by a downconverter 86, to generate output baseband data DCO. The multiplexer is controlled by a shutoff mechanism 88, as described hereinbelow. The embodiment of FIG. 6 saves the cost of one downconverter, relative to the embodiment of FIG. 3, but requires added complexity in the RFI canceller to deal with the high-rate digital signals.

RFI canceller module 85 comprises adaptive BPF 80, which generates filtered output data samples, labeled BPFO. The filtered samples include both amplitude and phase information. A corrector 82 generates the correction data CO. Shutoff mechanism 88 operates in like manner to that described hereinabove with reference to mechanism 54 in FIG. 3, controlling multiplexer 85 to select the uncorrected data ADm when the narrowband RFI in the auxiliary channel drops below a given level. Exemplary implementations of mechanism 88 are shown below in FIGS. 9 and 10. It is noted that although there is no multiplexer 85 shown in FIG. 3, a similar arrangement could be implemented in that embodiment for selecting the source of the phase and quadrature outputs, RXI and RXQ. Alternatively, shutoff mechanism 88 may control corrector 82 so that it generates a zero output value when the RFI in the auxiliary channel is insignificant.

Figure 7:
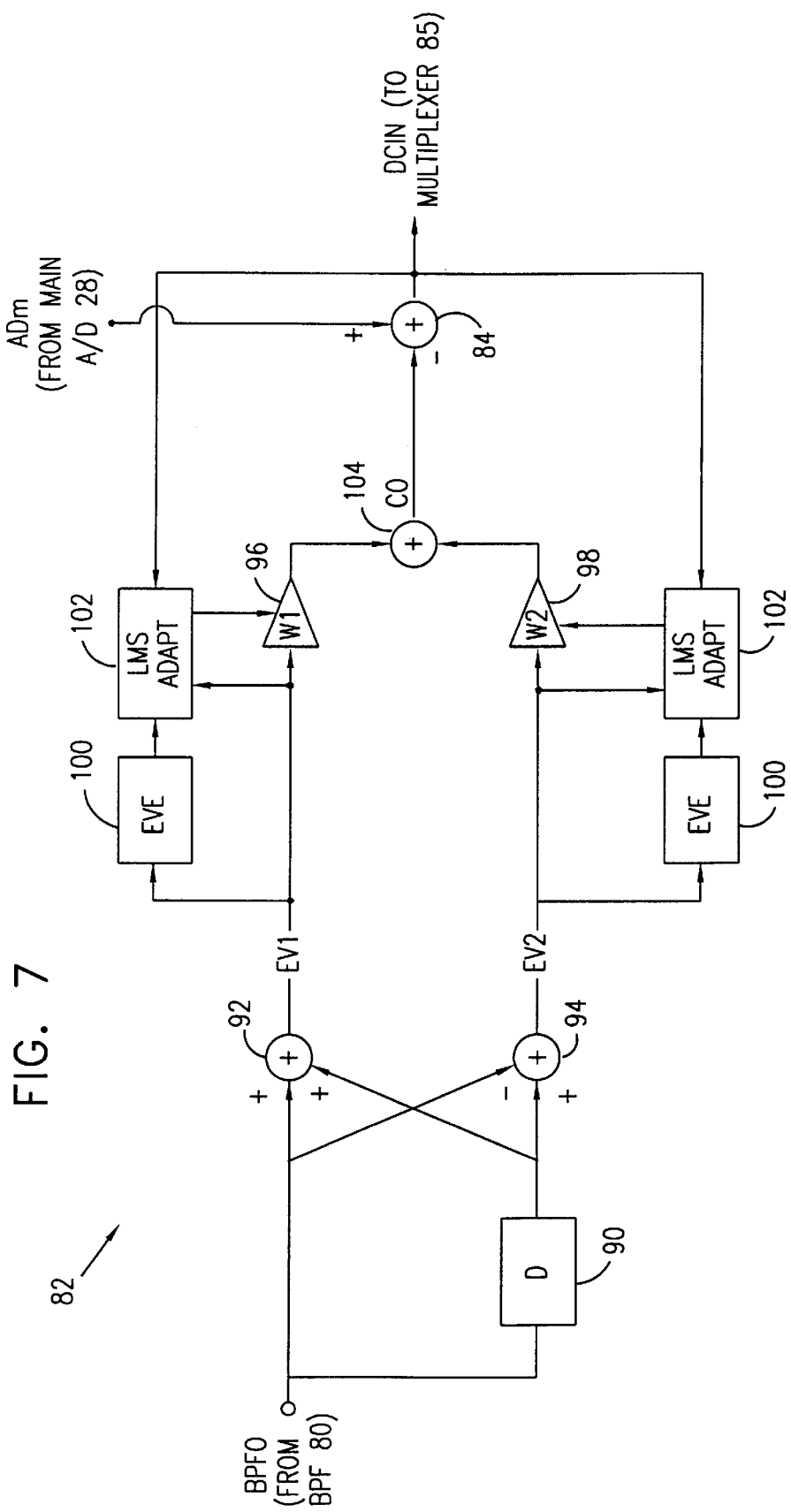
FIG. 7 is a block diagram that schematically illustrates further details of the RFI canceller module of FIG. 6, in accordance with a preferred embodiment of the present invention.

FIG. 7 is a block diagram that schematically illustrates details of corrector 82, in accordance with a preferred embodiment of the present invention. Corrector 82 is generally similar in its principle of operation to corrector 48, but uses an accelerated normalized LMS method to overcome the problem of eigenvalue spread that commonly occurs in processing the passband data. A delay line 90 and adders 92 and 94 are used to generate interim sample values $EV_1$ and $EV_2$, which estimate the signal eigenvalues, as given by:

$$EV_1(n)=BPFO(n)+BPF(n-1)$$

$$EV_2(n)=-BPFO(n)+BPF(n-1) \quad (4)$$

This operation has the effect of decorrelating successive samples into low-frequency ($EV_1$) and high-frequency ($EV_2$) components, as described in the above-mentioned book by Haykin, pages 455–482.

Corrector 82 has two taps 96 and 98, in order to apply both amplitude gain and phase rotation to the filtered samples BPFO. Taps 96 and 98 respectively multiply the interim values by variable gain coefficients $W_1$ and $W_2$, and the multiplication results are summed by an adder 104 to give an output CO. This output is subtracted from the main channel data ADm by adder 84, so as to generate corrected output data DCIN for input to downconverter 86.

The coefficients $W_1$ and $W_2$ are determined and updated by respective LMS adaptation modules 102. These modules receive eigenvalue estimates $EVE_1$ and $EVE_2$ from respective estimators 100, which are generally identical in operation to estimator 62, shown in FIG. 4. They also receive the respective interim values $EV_1$ and $EV_2$, as well as the corrected output value DCIN. $W_1$ and $W_2$ are then given by:

$$W_1(n+1) = W_1(n) + \mu \cdot EV_1(n) \cdot DCIN(n) \frac{1}{EVE_1(n)+\delta} \quad (5)$$

$$W_2(n+1) = W_2(n) + \mu \cdot EV_2(n) \cdot DCIN(n) \frac{1}{EVE_2(n)+\delta}$$

FIG. 8 is a block diagram that schematically illustrates details of adaptive BPF 80, in accordance with a preferred embodiment of the present invention. Adaptive BPF 46 in module 45 (FIG. 3) can be implemented in like manner. BPF 80 preferably has two pairs of conjugate poles and zeroes, located at the same angle on the unit circle, but with different radii. In the Z-domain, the transfer function of the filter is given by:

$$H(z) = \frac{B(z,\theta)}{A(z,\theta)} = \frac{1 - 2y\cdot\theta\cdot z^{-1} + y^2\cdot z^{-2}}{1 - 2x\cdot\theta\cdot z^{-1} + x^2\cdot z^{-2}} \quad (6)$$

The parameters x, y and θ control the characteristics of the filter poles and zeroes. Preferably, x and y are set to suitable values in the range 0.5<x,y<1.0, most preferably near (but less than) 1 to give a sharp band. As long as y>x, H(z) will perform as a bandpass filter, with a center frequency controlled by θ. Otherwise, it will be a band reject filter.

The parameters of BPF 80 must be adjusted adaptively, so that the BPF selects the strongest RFI component in the auxiliary channel data. Normally, adjusting the BPF parameters is a complicated problem, because the filter poles must be constrained within the unit circle. Therefore, BPF 80 uses a master-slave mechanism, in which an adaptive notch filter element 110 is driven to find the center frequency of the strongest RFI component. This center frequency is then used to control a bandpass element 112. In other words, adaptive notch filter element 110 estimates the parameter θ, used in equation (6), dependent on the peak frequency of the input data ADa from the auxiliary channel of receiver 20. This parameter θ is fed to bandpass element 112, which applies equation (6) to the input data so as to generate the filtered data BPFO for input to corrector 82.

Notch filter element 110 operates to minimize an error signal e(n), given by:

$$e(n)=ADa(n)-2\theta(n)\cdot ADa(n-1)+ADa(n-2) \quad (7)$$

This error signal is used to determine θ, using a normalized LMS method similar to that used to find W, wherein successive values of θ are given by the formulas:

$$\theta(n+1)=\theta(n)+\mu\cdot e(n)\cdot ADa(n-1)\cdot k(n)$$

$$\lambda(n+1)=\alpha\cdot[ADa(n-1)]^2+(1-\alpha)\cdot\lambda(n)$$

$$k(n)=2^{-fix[log(\lambda(n))]} \quad (8)$$

Here k(n) is an estimator of the input power, based on an estimated eigenvalue λ. α is a smoothing factor, typically set to about 0.1, and $\mu$ is a step size parameter, also typically about 0.1, as described hereinabove.

The output of bandpass element 112, BPFO, is thus given (in the time domain) by:

$$BPFO(n)=ADa(n)-2y\cdot\theta(n)\cdot ADa(n-1)+y^2\cdot ADa(n-2)+ \\ 2x\cdot\theta(n)\cdot BPFO(n-1)-x^2\cdot BPFO(n-2) \quad (9)$$

While FIG. 8 shows one preferred type of master-slave adaptive BPF, other implementations of this master-slave principle will be apparent to those skilled in the art, and are considered to be within the scope of the present invention. Furthermore, other types of adaptive filters may also be used to perform the functions of BPF 46 and BPF 80. On the other hand, it will also be appreciated that the master-slave arrangement of BPF 80, as shown and described hereinabove, is novel in and of itself and may find application in other signal processing contexts.

Figure 9:
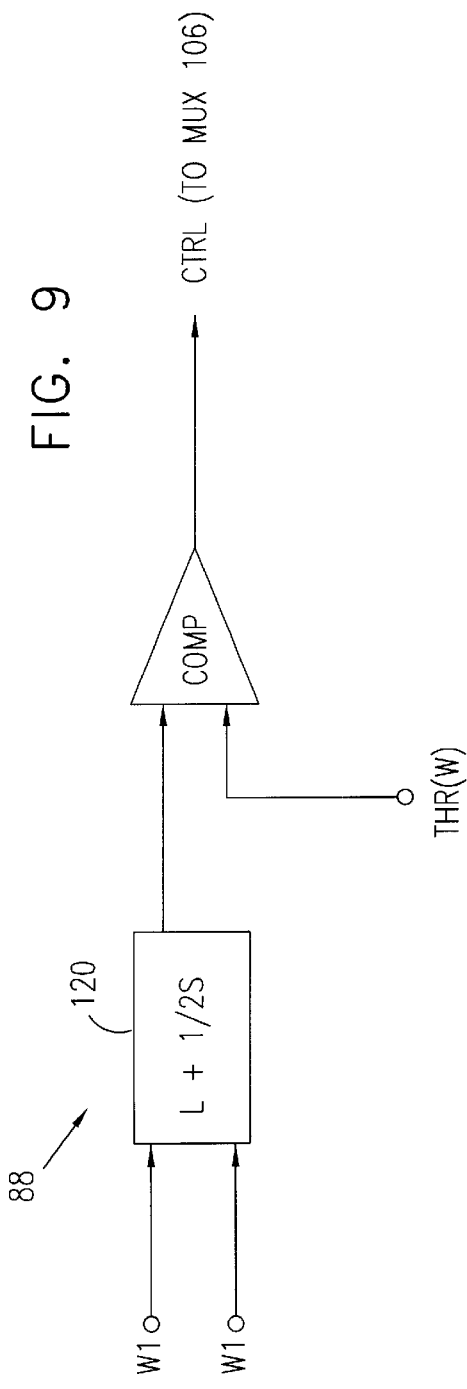
FIG. 9 is a block diagram that schematically illustrates a shutoff mechanism for the RFI canceller module of FIG. 6, in accordance with a preferred embodiment of the present invention.

FIG. 9 is a block diagram that schematically illustrates details of shutoff mechanism 88, in accordance with a preferred embodiment of the present invention. This mechanism, as well as the alternative embodiment described hereinbelow with reference to FIG. 10, may similarly be used, mutatis mutandis, in shutoff mechanism 54 (FIG. 3). Other possible shutoff mechanisms will be apparent to those skilled in the art and are considered to be within the scope of the present invention.

In the present embodiment, mechanism 88 controls multiplexer 85 to effectively shut off subtraction of the correction output CO when coefficients $W_1$ and $W_2$ exceed a predetermined threshold, THR(W). Ideally, the shutoff would be based on a root mean square (RMS) value of the coefficients, i.e., on $\sqrt{W_1^2+W_2^2}$. Because the square root is difficult to compute, mechanism 88 instead uses an RMS estimator 120, which generates an output value L+½S, equal to the larger of the coefficients $W_1$ and $W_2$, denoted by L, plus half of the smaller of the coefficients, denoted by S. A comparator 122 compares this output value to THR(W), which is typically set to be about 1. If the output value exceeds the threshold, then mechanism 88 considers that the narrowband noise is relatively insignificant, and multiplexer 85 is instructed to select ADm, rather than DCIN, for output to downconverter 86.

Figure 10:
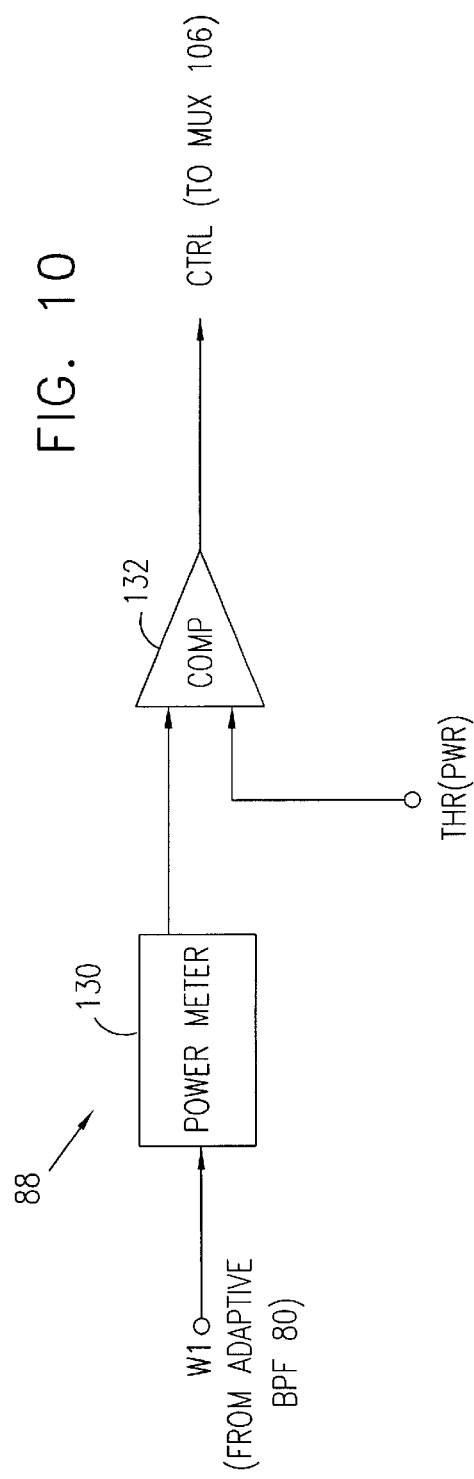
FIG. 10 is a block diagram that schematically illustrates a shutoff mechanism for the RFI canceller module of FIG. 6, in accordance with another preferred embodiment of the present invention.

FIG. 10 is a block diagram that schematically illustrates details of shutoff mechanism, in accordance with another preferred embodiment of the present invention. In this case, the output power of the narrowband data BPFO from adaptive BPF 80 is evaluated by a power meter 130. Typically, the power meter finds a running RMS average over a sequence of the BPFO values. This average power is compared to a power threshold THR(PWR) by a comparator 132. The threshold is preferably set to a value that is several times greater than a baseline power level of the wideband noise. If the output power is less than the threshold, then multiplexer 85 is instructed to select ADm.

Although preferred embodiments are described hereinabove with reference to a VDSL modem, it will be appreciated that the principles of the present invention may similarly be applied in modems and receivers of other types. Furthermore, although these preferred embodiments are based on digital processing, it will be understood that elements of the present invention may similarly be implemented using analog processing techniques, or a combination of analog and digital processing elements, as are known in the art.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A high-speed receiver, adapted to receive signals over an input line in the presence of narrowband radio frequency interference (RFI), comprising:
   a RFI canceller module, which is coupled to receive samples of the interference from the input line, and which comprises:
      an adaptive bandpass filter, which is adapted to track a dominant frequency of the interference, and to generate a filtered output in a narrow frequency range centered on the dominant frequency; and
      a corrector, which is coupled to receive the filtered output from the adaptive bandpass filter and to generate, responsive thereto, an estimate of the interference in the signals received by the receiver; and
   a subtractor, which is adapted to subtract the estimate of the interference from the signals received by the receiver so as to generate a corrected output signal,
   wherein the corrector is adapted to determine a variable filter coefficient using a normalized least-mean-square method and to apply the coefficient to the filtered output from the adaptive bandpass filter so as to generate the estimate of the interference.

2. A receiver according to claim 1, wherein the RFI canceller module comprises a shutoff mechanism, which is adapted, responsive to a value of the filter coefficient, to inhibit subtraction of the estimate of the interference from the signals.

3. A receiver according to claim 2, wherein the shutoff mechanism is configured to inhibit the subtraction when the value of the filter coefficient rises above a predetermined threshold.

4. A high-speed receiver, adapted to receive signals over an input line in the presence of narrowband radio frequency interference (RFI), comprising:
   a RFI canceller module, which is coupled to receive samples of the interference from the input line, and which comprises:
      an adaptive bandpass filter, which is adapted to track a dominant frequency of the interference, and to generate a filtered output in a narrow frequency range centered on the dominant frequency; and
      a corrector, which is coupled to receive the filtered output from the adaptive bandpass filter and to generate, responsive thereto, an estimate of the interference in the signals received by the receiver; and
   a subtractor, which is adapted to subtract the estimate of the interference from the signals received by the receiver so as to generate a corrected output signal,
   wherein the RFI canceller module comprises a shutoff mechanism, which is adapted to inhibit subtraction of the estimate of the interference from the signals when an amplitude of the narrowband interference on the line drops below a given minimum level.

5. A high-speed receiver, adapted to receive signals over an input line in the presence of radio frequency interference (RFI), comprising:
   a corrector, which is coupled to receive samples of the interference from the input line and to generate, responsive to the interference, an estimate of the interference in the signals received by the receiver;
   a subtractor, which is adapted to subtract the estimate of the interference from the signals received by the receiver so as to generate a corrected output signal; and
   a shutoff mechanism, which is adapted to inhibit subtraction of the estimate of the interference from the signals when an amplitude of the interference on the line drops below a given minimum level.

6. A receiver according to claim 5, wherein the shutoff mechanism is adapted to inhibit and to re-initiate the subtraction substantially autonomously.

7. A receiver according to claim 5, wherein the interference at least intermittently comprises a narrowband interference component, and wherein the shutoff mechanism is adapted to inhibit the subtraction when the narrowband interference component drops below the given minimum level.

8. A method for processing signals received over an input line in the presence of narrowband radio frequency interference (RFI), comprising:
   tracking a dominant frequency of the interference;
   filtering the interference so as to generate a filtered output in a narrow frequency range centered on the dominant frequency;
   generating, responsive to the filtered output, an estimate of the interference in the signals received over the line; and
   subtracting the estimate of the interference from the received signals so as to generate a corrected output signal,
   wherein generating the estimate of the interference comprises determining a variable filter coefficient using a normalized least-mean-square method, and applying the coefficient to the filtered output so as to generate the estimate of the interference.

9. A method according to claim 8, and comprising inhibiting subtraction of the estimate of the interference from the signals, responsive to a value of the filter coefficient.

10. A method for processing signals received over an input line in the presence of narrowband radio frequency interference (RFI), comprising:
   tracking a dominant frequency of the interference;
   filtering the interference so as to generate a filtered output in a narrow frequency range centered on the dominant frequency;
   generating, responsive to the filtered output, an estimate of the interference in the signals received over the line;
   subtracting the estimate of the interference from the received signals so as to generate a corrected output signal; and inhibiting subtraction of the estimate of the interference from the signals when an amplitude of the narrowband interference on the line drops below a given minimum level.

11. A method for processing signals received over an input line in the presence of radio frequency interference (RFI), comprising:

generating, responsive to samples of the interference received from the input line, an estimate of the interference in the signals received over the line;

subtracting the estimate of the interference from the received signals so as to generate a corrected output signal; and automatically inhibiting subtraction of the estimate of the interference from the signals when an amplitude of the interference on the line dross below a given minimum level.

12. A method according to claim 11, wherein the interference at least intermittently comprises a narrowband interference component, and wherein automatically inhibiting the subtraction comprises inhibiting subtraction when the narrowband interference component drops below the given minimum level.

* * * * *